3,658,996
SYSTEM FOR THE REMOVAL OF HYDROGEN FROM NUCLEAR CONTAINMENT STRUCTURES
Robert Frumerman, Pittsburgh, and John D. McAdoo, Jr., Murrysville, Pa., assignors to Westinghouse Electric Company, Pittsburgh, Pa.
Filed Feb. 3, 1969, Ser. No. 795,950
Int. Cl. B01j *1/00;* G21f *9/02;* C01b *5/00*
U.S. Cl. 23—252                           5 Claims

ABSTRACT OF THE DISCLOSURE

A system for the direct combustion of hydrogen within a reactor containment structure to prevent the formation of an explosive atmosphere therein. A blower produces a predetermined flow of containment hydrogen to a combustion chamber and additional amounts of hydrogen and oxygen are added to facilitate complete burning so as to minimize the quantity of hydrogen remaining within the containment. A separate system cools and condenses the gases leaving the chamber so as to prevent stratification and localized temperature increases.

BACKGROUND OF THE INVENTION

This invention relates to systems for removing hydrogen from a nuclear containment structure, and more particulraly to such systems which accomplish this result through combustion in a burner.

In the unlikely event of a loss of coolant accidents in a nuclear power reactor, particularly a reactor of the water cooled variety, hydrogen can be generated in the sealed containment which houses the reactor vessel. The mechanism of hydrogen generation is mainly radiolysis although other chemical reactions can be involved. The hydrogen builds up in the containment and can reach and exceed flammable limits particularly since the containment may not be vented after an accident for a considerable period of time in order to avoid release of radioactive materials to the atmosphere. Hence, an explosion hazard may be created within the containment.

A number of safety systems are disclosed in the prior art which might be considered to deal with this problem; each have inherent disadvantages:

It has been proposed that relatively substantial quanties of inert gases be added to the containment atmosphere so as to reduce the percentage of combustible hydrogen within the containment and thereby avoid explosive mixtures. Such a system has the inherent disadvantage of resulting in a high pressure within the containment and necessitating the design of a relatively expensive containment structure to bear such pressures.

It has also been proposed that the containment atmosphere be passed through a chamber containing a catalyst which aids in the combination of the hydrogen and the oxygen therein so as to produce a large percentage of nonexplosive water vapor which can be condensed if desired. The difficulty here is that such catalysts are highly susceptible to poisoning, that is, being rendered ineffective during the early stages of life due to chemical changes in the catalyst itself. Although various measures have been proposed to prevent poisoning, they are in general very difficult to accomplish with high reliability in the complex chemical environment of a nuclear containment system.

Pat. No. 3,307,913 issued to C. T. Chave on Mar. 7, 1967, discloses the use of what may be termed open flame combustion within a burner to produce a vacuum within a containment vessel. Although this patent does not deal with the problem of removing radiolitically produced hydrogen so as to avoid an explosive atmosphere, the burner used to produce a vacuum does burn a portion of the hydrogen within the containment system. In order to accomplish this, Chave teaches conveying a portion of the atmosphere to a combustion chamber by natural circulation and adding hydrogen from a source exterior to the containment so as to produce a combustible atmosphere within the chamber. Chave, however, provides no exterior source or means of ingress for excess amounts of oxygen to the burning chamber since his object is to produce a vacuum by depleting the oxygen content of the atmosphere. In the Chave system, the combustor will operate in an atmosphere which becomes depleted of oxygen with continuing operation with consequent increase in the unburned hydrogen content of the exhaust. During continued operation, the flame within the burner shown in the Chave patent becomes increasingly unstable and unreliable before the oxygen level is depleted to a point where a hydrogen explosion hazard is eliminated. Although other patents, as for example Pat. No. 3,155,310, issued to A. Lorenz on Nov. 3, 1964, teach the addition of excess oxygen to a hydrogen mixture so as to achieve a more complete combustion of the mixture in order to produce a vacuum, a straightforward addition of an oxygen line to a combustion system such as that of Chave would still not yield satisfactory results. In particular, the combined system would be unsatisfactory in that it would depend upon stratification (inherent in the Chave natural circulation system) to obtain sufficient gas removal, and might be subject to flame flashback. Water vapor exists from the combustion chamber toward the top of the containment forming a gas-strata from which flow into the the combustion chamber results from natural circulation. The inherent stratification of gases could produce explosive pockets of hydrogen. Moreover, in the absence of a positive source of gas to the burner, the flame could flashback or exit from the burner into the containment through the gas inlet lines.

SUMMARY OF THE INVENTION

A system for the removal of hydrogen from the containment structure of a nuclear reactor approximately as fast as it is formed is achieved in accordance with this invention by the provision of a combustion chamber which directly burns the hydrogen as it is formed. An atmosphere conducive to stable combustion is enhanced through the addition of hydrogen and excess oxygen to the combustion chamber.

A blower circulates a portion of the containment atmosphere through the combustion chamber at a rate such that the combustion of the hydrogen in the circulated gas will hold the hydrogen below flammable limits at a known hydrogen generation rate. To sustain combustion at the proper rate, additional hydrogen fuel is added at the burner from a gas reservoir or gas generator outside the containment. As oxygen in the containment is used up, oxygen is added from the source external to the containment into the containment.

In particular, the hydrogen fuel feed rate from the external source is controlled so that its combustion results in a rise in temperature to at least 1600° F. as the containment atmosphere is forced into the combustion chamber. Since this temperature is well above that at which the hydrogen-air reaction is essentially complete, this results in a fairly complete oxidation of the hydrogen within the chamber. As oxygen is needed, it is added to the containment atmosphere at a flow rate stoichiometrically proportioned to the flow of hydrogen fuel.

A separate system in the containment circulates and cools the containment gases. The circulation rate is chosen high enough to keep the containment gases well mixed and to avoid stratification of the hydrogen as it is generated.

The cooling system condenses water formed by the oxidation of the hydrogen within the combustion chamber. The use of hydrogen as a fuel has the advantage of never increasing the mols of non-condensible gas in the containment. As a result of this last mentioned feature, there is also no danger of an increase in the pressure within the containment.

DESCRIPTION OF THE DRAWINGS

For a better understanding of the invention, reference may be had to the accompanying drawings, in which.

DESCRIPTION OF THE PREFERRED EMBODIMENTS

Figure 1:
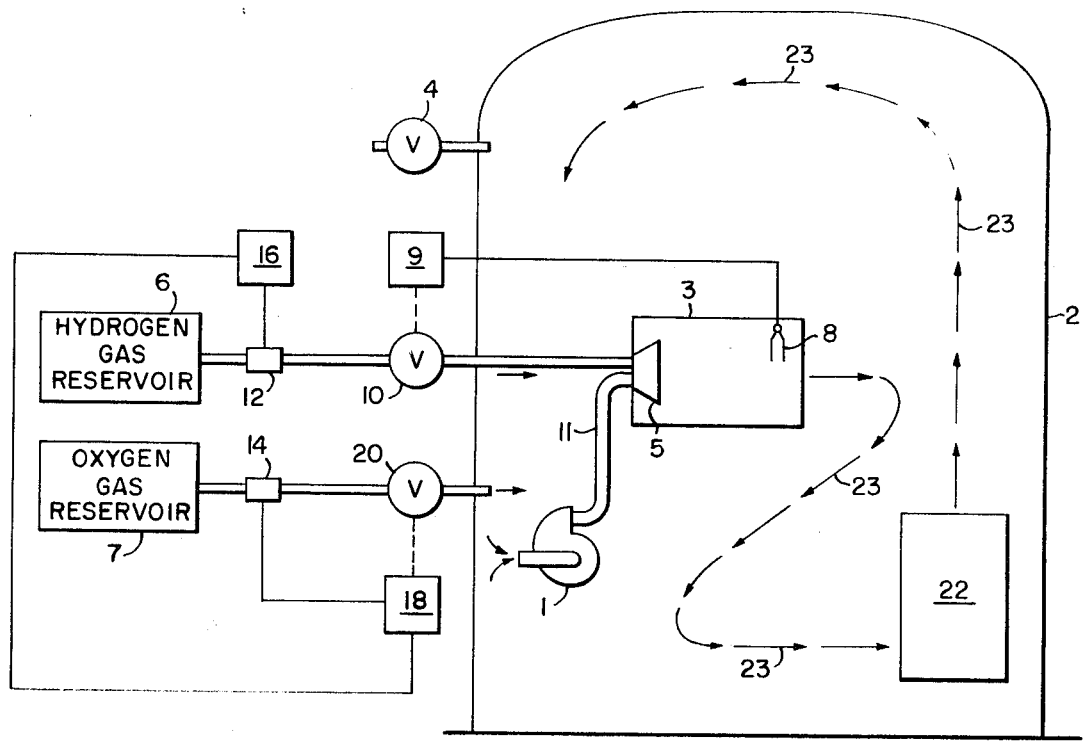
FIG. 1 is a schematic view of a containment system in accordance with this invention.

The system in accordance with this invention provides various means capable of the direct combustion of hydrogen within a nuclear containment system at approximately as fast as it is formed so as to hold its concentration well below the lower flammable limit of hydrogen, i.e., below approximately 4% by volume. The features of this system may be best understood by referring first to FIG. 1. A blower 1 is shown therein which circulates a portion of the gases within the sealed nuclear containment structure 2 through a combustion chamber 3 at a rate such that the combustion of the hydrogen in the circulated gas will hold the amount of hydrogen remaining in the containment 2 below the lower flammable limit of hydrogen, at a known hydrogen generation rate. Knowledge of the hydrogen and oxygen concentration in the containment 2 may be ascertained at any time by drawing a sample from the containment through a valve 4 and analyzing such gas. In order to sustain combustion at the proper rate, and to stabilize the flame in combustion chamber 3, additional hydrogen fuel must be added at the burner 5 within the combustion chamber 3 from a hydrogen gas reservoir 6 or a gas generator which is conveniently outside of the containment 2. It is desirable to add oxygen as the oxygen within the containment 2 is used up in the combustion chamber 3. For this purpose, an oxygen gas reservoir 7 may be conveniently situated outside of the containment and the oxygen may be fed directly into the containment 2. The flame can be initiated utilizing the spark and pilot flame igniters common in the burner art.

The hydrogen fuel feed rate may be controlled by fixing a temperature sensor 8, such as a thermocouple, within the combustion chamber 3. The signal generated by the temperature sensor 8 is fed to a controller means 9 of conventional design which in turn controls a variable valve 10 on the hydrogen feed line. The controller 9 operates so as to assure combustion in the chamber 3 at a set point temperature of approximately 1600° F., as ascertained by the temperature sensor 8. This is well above the temperature (about 1325° F.) at which a hydrogen air reaction is essentially complete. As a result, hydrogen in the circulated atmosphere is consumed by oxidation under flame conditions maintained by the outside fuel source. When oxygen is needed, its flow is stoichiometrically proportioned to the flow of hydrogen fuel. This may be conveniently accomplished by affixing a flow measuring device 12 of conventional design on the hydrogen line and a similar flow measuring device 14 on the oxygen line. The flow rates ascertained by the flow measuring device 12 on the hydrogen line is utilized by a flow controller 16 to in turn set a control point for a similar flow controller 18 which controls a variable valve 20 on the oxygen line, as is common in the art. The flow of hydrogen and oxygen is, of course, dependent upon the flow of gas entering through conduit 11 which may be set by the size of blower 1.

A separate containment circulatory system 2 of a well known structure, circulates and cools the containment gases. Its circulating rate should be high enough to keep the containment gases well mixed and to avoid stratification of the hydrogen as it is generated.

The containment cooling-circulatory system 22 condenses the water formed by the oxidation of the hydrogen within the combustion chamber 3. Arrows 23 show the general flow pattern. It is to be noted that use of hydrogen as a fuel in the burner 5 has the advantage of never increasing the mols of non-condensible gas in the containment. In fact while the containment air is utilized as the oxidant, that is, before oxygen is admitted from the storage tank 7, the containment pressure can sometimes fall below atmospheric pressure.

In order to avoid undesirable local condition due to the exhaust of very hot gases from the combustion chamber 3 to the containment atmosphere, the hot gases may be cooled as by quenching with a water spray, rapid mixing, or diluting with the containment air, or other suitable means.

Figure 2:
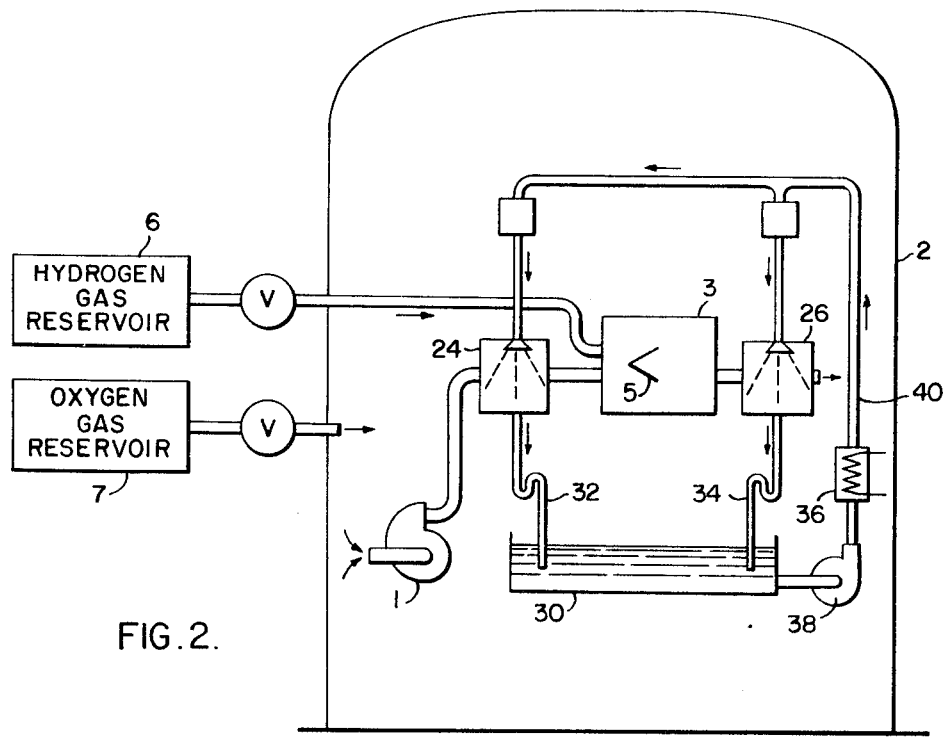
FIG. 2 is a schematic view of a second embodiment of the invention.

As indicated the embodiment of FIG. 1, is utilized to burn hydrogen approximately as fast as it is formed within the containment 2. Another embodiment is shown in FIG. 2 in which the same numeral identifies similar structure is modified so as to be capable of being lit and utilized to reduce the hydrogen in the containment 2 when the said hydrogen concentration is above the aforementioned lower flammable limit. In this embodiment, the blower 1 circulates the gas from the containment 2 through a flame arrester 24 which may be of the water curtain type, as shown, but also might be metallic as is well known in the art. Gases flowing from the flame arrester 24 to the combustion chamber 3 should be under a sufficient pressure so as to pass into the combustion chamber 3 at a velocity exceeding the flame propagation velocity of hydrogen so as to avoid flashback. The burner 5 in the combustion chamber 3 is preferably of a simple geometry such as a V-bar so as to be relatively unaffected by the entering stream and may be of ceramic material or water cooled so as to remain unaffected by the flame. Gases leaving the combustion chamber 3 exit through a second flame arrester 26, similar in structure to the arrester 24, into the containment 2. When the level of hydrogen in the containment is reduced to a concentration which will not sustain a stable flame, the external fuel may be added from a hydrogen source 6' as the previous embodiment. Likewise oxygen may be added from a source 8. If water spray type flame arresters 24 and 26 are utilized, the water therefrom may be drained to a sump 30 preferrably with the ends of the drain pipes 32 and 24, respectively, positioned below the liquid surface in the sump 30. The flame arresters 24 and 26 may take their flow from sump 30 by way of a heat exchanger 36 and pump 38 affixed to conduit 40.

While there has been shown and described what are considered to be the preferred embodiments of the invention modifications will readily occur to those skilled in the art. In particular, devices other than a blower may be used to circulate the containment gases. For example, a water operated eductor can be used to advantage. Accordingly, it is not desired that the scope of this inveniton be limited to the specific embodiments, which should be viewed as illustrative only, but rather that the true scope and spirit of the invention be enumerated in the appended claims.

We claim:
1. A system for the removal of hydrogen from a containment structure which comprises:
   a combustion chamber having a burner therein;
   blower means for introducing the containment structure atmosphere into the combustion chamber at a predetermined flow rate;
   first containment means for storing a quantity of hydrogen;

second containment means for storing a quantity of oxygen;

means for introducing hydrogen into the combustion chamber from said first containment means;

means for introducing oxygen into the containment structure from said second containment means;

means for igniting the burner;

a temperature sensor coupled to the combustion chamber, a first control means for regulating the flow of hydrogen into the combustion chamber from said first containment means, said sensor being connected to said first control means such that the first control means increases the flow of hydrogen until the temperature of the burning mixture within the combustion chamber reaches at least 1325° F.; and second control means for regulating the flow of oxygen from said second containment means, said first and second control means being so associated as to produce a stoichiometric introduction of hydrogen and oxygen into the combustion chamber.

2. The system of claim 1 including means for circulating the atmosphere within the containment whereby stratification of hydrogen within the containment is avoided.

3. The system of claim 1 including a flame arrester coupled to said means for introducing a portion of the containment atmosphere into the combustion chamber.

4. The system of claim 1 wherein the burner within the combustion chamber is substantially isolated from the containment structure atmosphere.

5. The system of claim 1 wherein the combustion chamber is within the containment structure.

References Cited

UNITED STATES PATENTS

| | | | |
|---|---|---|---|
| 2,943,921 | 7/1960 | King | 23—288 |
| 3,155,310 | 11/1964 | Lorenz | 230—69 |
| 3,307,913 | 3/1967 | Chave | 23—252 |

JAMES H. TAYMAN, Jr., Primary Examiner

U.S. Cl. X.R.

176—19, 37; 23—281, 204;136—86; 204—129